(12) United States Patent
Hung

(10) Patent No.: US 6,747,803 B2
(45) Date of Patent: Jun. 8, 2004

(54) COLOR WHEEL WITH BALANCING GROOVE

(75) Inventor: Tech Hung, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 65 days.

(21) Appl. No.: 10/064,743

(22) Filed: Aug. 12, 2002

(65) Prior Publication Data

US 2003/0035218 A1 Feb. 20, 2003

(30) Foreign Application Priority Data

Aug. 17, 2001 (TW) ..................... 90214228 U

(51) Int. Cl.⁷ .................. G02B 27/14; G02B 21/26
(52) U.S. Cl. .................. 359/634; 353/31; 353/34; 353/37
(58) Field of Search ............ 359/634, 682, 359/681, 691; 353/31, 34, 37; 348/335–339; 349/9

(56) References Cited

U.S. PATENT DOCUMENTS 6,011,662 A * 1/2000 Evans ................ 359/891

* cited by examiner

*Primary Examiner*—Hung X. Dang
(74) *Attorney, Agent, or Firm*—Winston Hsu

(57) ABSTRACT

A color wheel with a balancing groove comprises a carrier, having a central axis, a external surface, and a periphery, and rotates along the central axis; a set of filter plate sharing the same central axis with the carrier, wherein one or more annular groove is disposed on the external surface of the loading element, and a balancing substance is added into the annular groove to balance the color wheel.

5 Claims, 4 Drawing Sheets

COLOR WHEEL WITH BALANCING GROOVE

BACKGROUND OF INVENTION

1. Field of the Invention

The present invention relates to a projecting device, more particularly to a color wheel used in a projecting device.

2. Description of the Related Art

The prior art of balancing a color wheel mainly includes the following two methods; the first method is to apply adhesive materials onto the motor or the carrier, but such method may easily cause interference to the mechanism or optical path; the second method is to drill holes on the carrier in order to balance the color wheel, but such method has difficulties to control the exertion of force, and thus may easily cause damages to the bearing, and the metal powder or bits may easily contaminate and scrape the coating surface and thus causes defects.

To solve the shortcomings of the prior art methods, the present inventor discloses a color wheel that forms a annular groove at the position originally intended for the drilling holes on the external surface of the carrier, so that when the color wheel cannot balance its rotation, a balancing material, such as glue, is filled into the annular groove instead of drilling holes to attain the effect of balancing the color wheel. In the meantime, it can avoid excessive filling of materials that goes beyond the height of the external surface of the carrier and then generating the interference.

SUMMARY OF INVENTION

The objective of the present invention is to provide a color wheel with balancing groove, wherein a balancing material is filled into the annular groove disposed on the external surface of the carrier to avoid excessive filling of materials and resulting the interference.

In order to attain this objective, the color wheel of the present invention comprises a carrier, substantially in the shape of a circular disc, having a central axis, a external surface, and a periphery, which rotates along the central axis; a set of filter plate, having at least a filter plate. The set of filter plate shares the same central axis of the carrier, wherein a circular groove is disposed on the external surface of the carrier, and stays away from the periphery at a predetermined radial distance, and a balancing material can be added into the circular groove to attain the purpose of balancing the color wheel.

BRIEF DESCRIPTION OF DRAWINGS

For a more complete understanding of the present invention and the advantage thereof, reference is now made to the following description taken in conjunction with the accompanying drawings in which.

DETAILED DESCRIPTION

To make it easier to understand the objective of the invention, we use a preferred embodiment together with the attached drawings for the detailed description of the invention.

Figure 1:
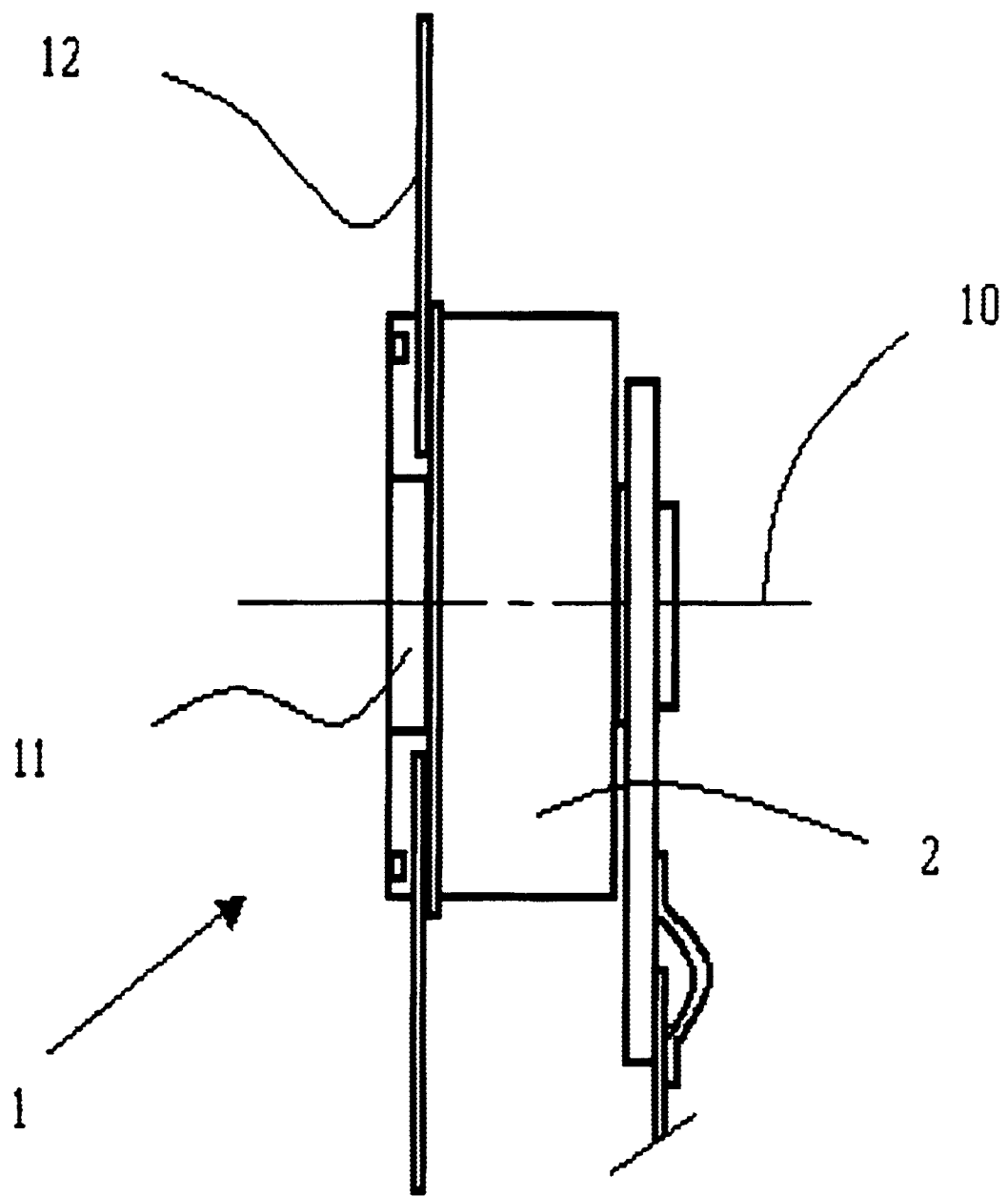
FIG. 1 is a schematic diagram of the assembly of a color wheel and a motor according to a preferred embodiment of the present invention.
Figure 2:
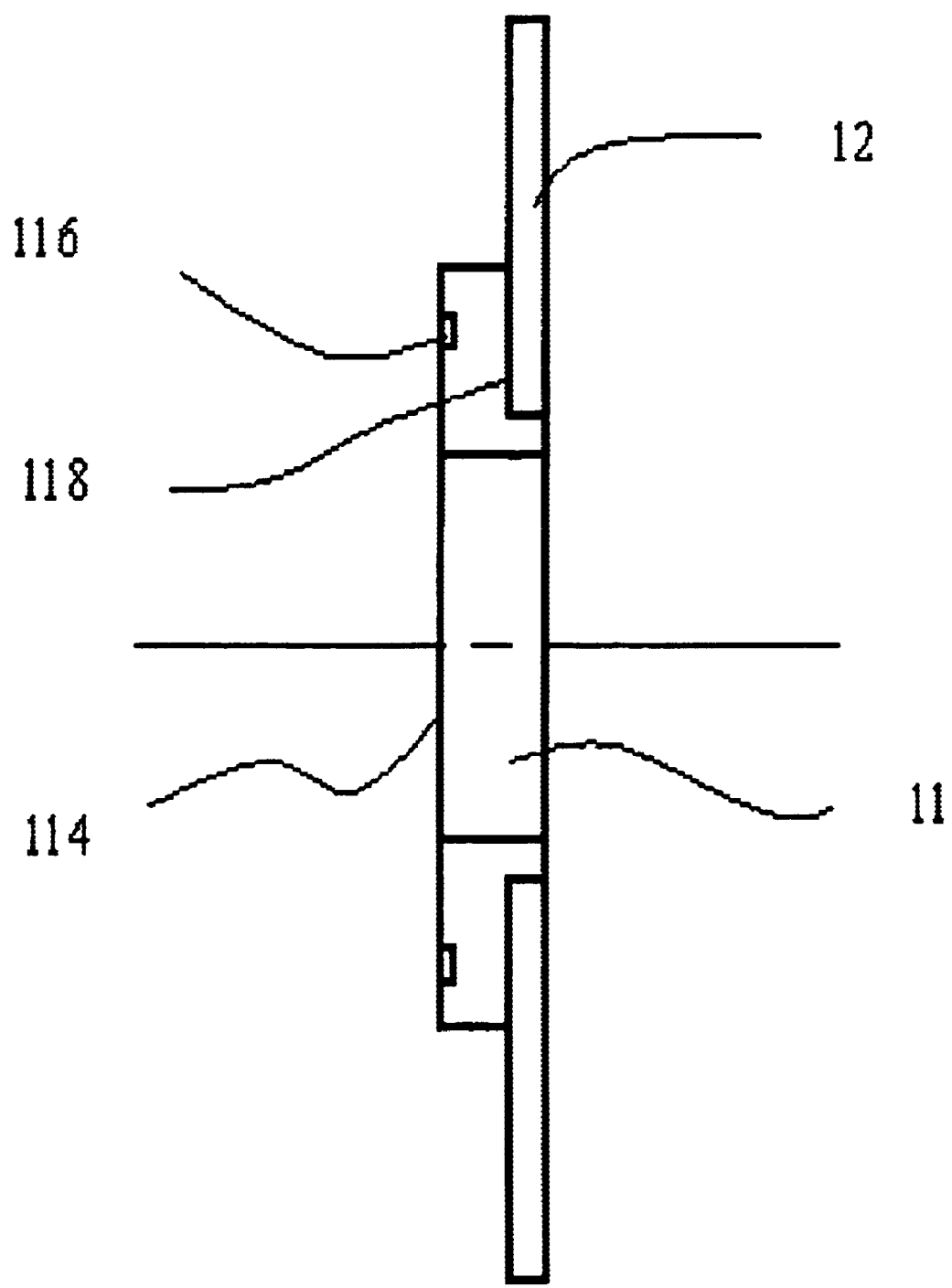
FIG. 2 is a schematic diagram of the radial cross-section of the color wheel after the motor shown in FIG. 1 is removed.
Figure 3:
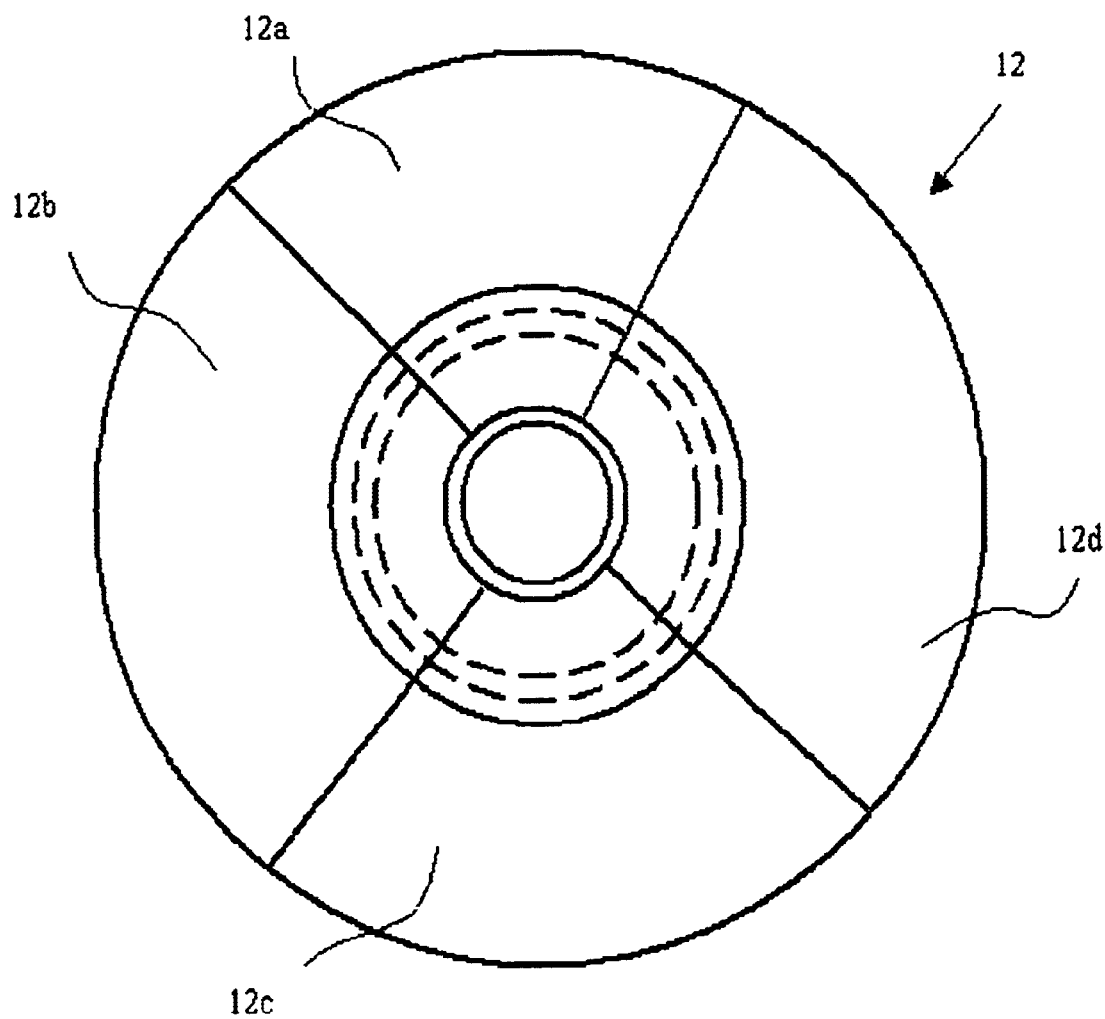
FIG. 3 is a right side view of the color wheel shown in FIG. 2.
Figure 4:
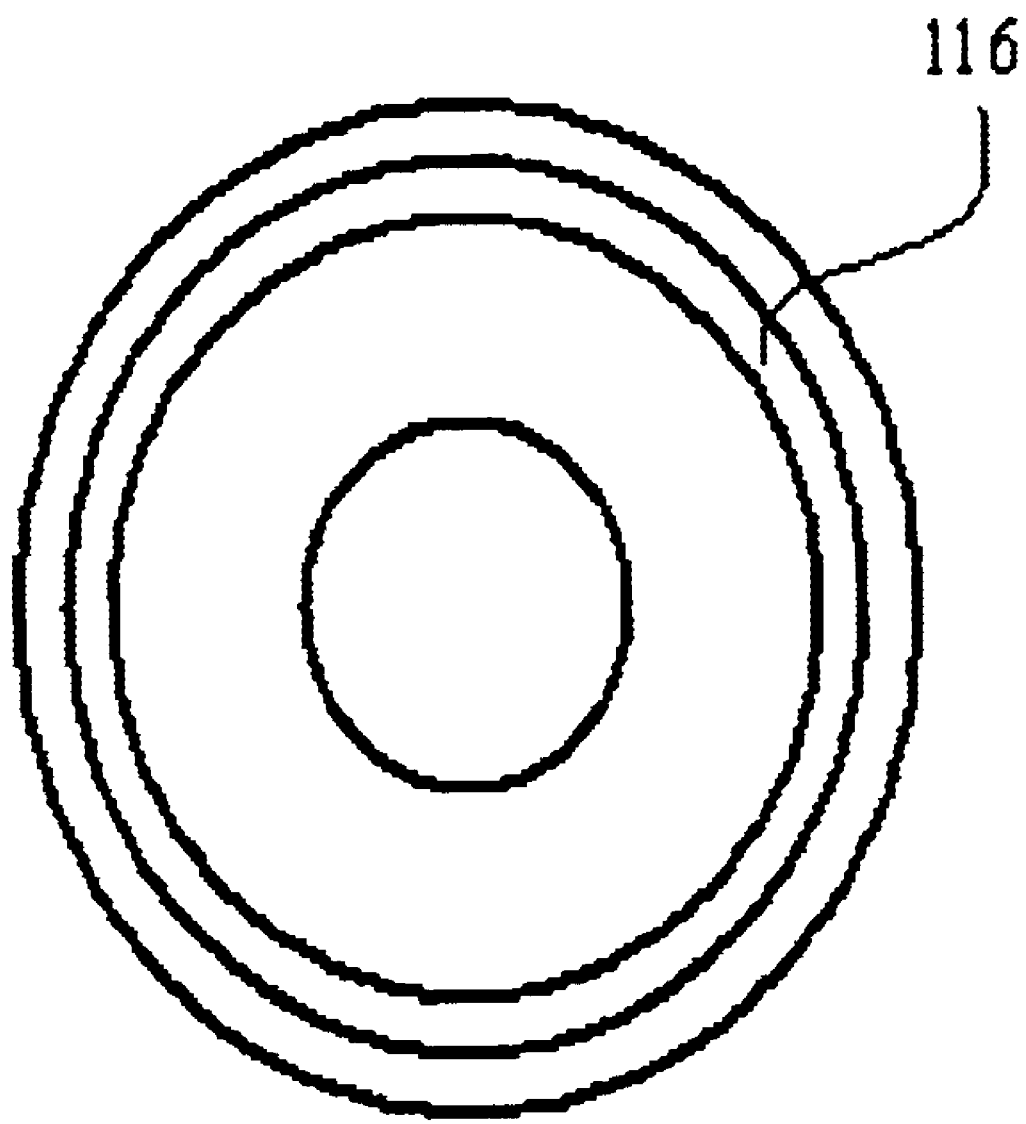
FIG. 4 is a left side view of the carrier after the set of circular filter plate as shown in FIG. 3 is removed.

Referring to FIG. 1, the color wheel 1 of a preferred embodiment of the present invention comprises a carrier 11 substantially in the shape of a circular disc, and a set of filter plate 12 in the shape of a circular disc. The color wheel 1 is installed on the rotary axle (not shown in the figure) of the motor, and rotates along its central axis 10. The set of circular filter plate 12 is adhered between the carrier 11 and the motor 2 by an adherent agent 118. Please refer to FIGS. 2 and 3, the internal surface of the carrier 11 is adhered to the set of circular filter plate 12 to constitute the color wheel 1. An annular groove 116 is disposed on the external surface 114 of the carrier 11. A balancing substance such as the UV glue can be filled into an annular groove 116 so that the unbalanced color wheel 1 can be balanced. In addition, the height of the filler will not go beyond the external surface 114 that may cause the phenomenon of interferences. The set of circular filter plate 12, shown in FIG. 3, comprises four filter plates 12a, 12b, 12c, 12d. Each filter plate 12a, 12b, 12c, 12d is composed of a piece of fan-shaped glass (not shown in the figure) and a filter film (not shown in the figure) having a predetermined color and being coated on the fan-shaped glass. Please refer to FIG. 4. The annular groove 116 stays apart from the center of the carrier 11 with a predetermined radial distance, and has an appropriate depth, such as 0.5 mm, and an appropriate width, such as 1.5 mm, or is extended and passes through the periphery of the carrier 11. By filling a balancing substance, such as the UV glue, into the annular groove 116, the color wheel 1 can be adjusted and balanced to overcome the shortcomings of the prior-art color wheel.

It is to be understood that the above description covering some of the preferred embodiments of the present invention shall not be based to restrict or limit the range of applicability of the present invention, and that all modifications or variations made without departing from the spirit of the invention shall be included in the subject claim. For instance, the annular groove 116 could be substituted by a square groove (not shown in the figure) or a plurality of annular grooves (not shown in the figure), and a single circular filter plate (not shown in the figure can substitute the foregoing four filter plates 12a, 12b, 12c, 12d. It is obvious that such arrangement falls within the spirit and scope of the present invention.

What is claimed is:

1. A color wheel with balancing groove comprising:

a carrier having a central axis and a external surface, rotating along the central axis; and a set of filter plate sharing the same axis with the carrier;

wherein at least one annular groove is disposed on the external surface of the carrier, and a balancing substance is applied into the annular groove to balance the color wheel.

2. A color wheel with balancing groove of claim 1, wherein said annular groove is in the shape of a ring.

3. A color wheel with balancing groove of claim 1, wherein said annular groove is extended and passes through the periphery of the carrier.

4. A color wheel with balancing groove of claim 1, wherein said set of filter plate comprises at least a filter plate.

5. A color wheel with balancing groove of claim 1, wherein said annular groove keep a radial distance from the periphery.

* * * * *